June 14, 1955 C. W. STARR 2,710,485
POISON BAIT STATION
Filed March 30, 1954 2 Sheets-Sheet 1
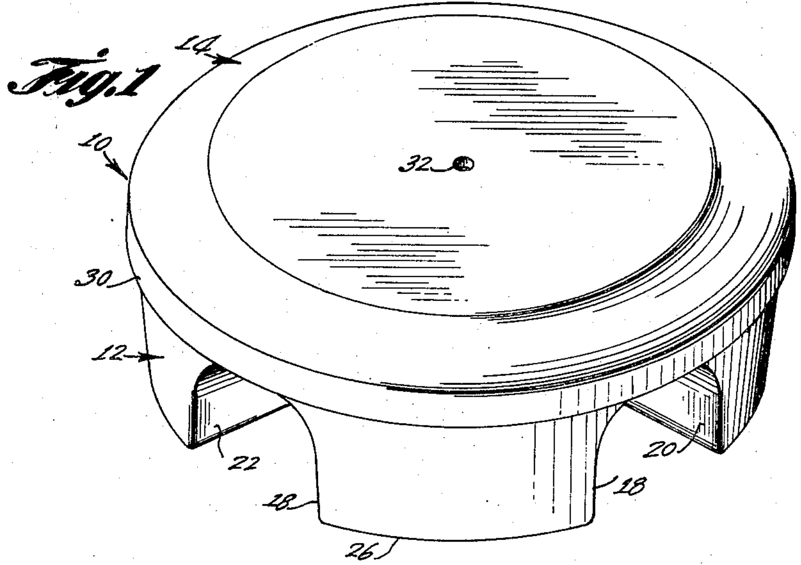
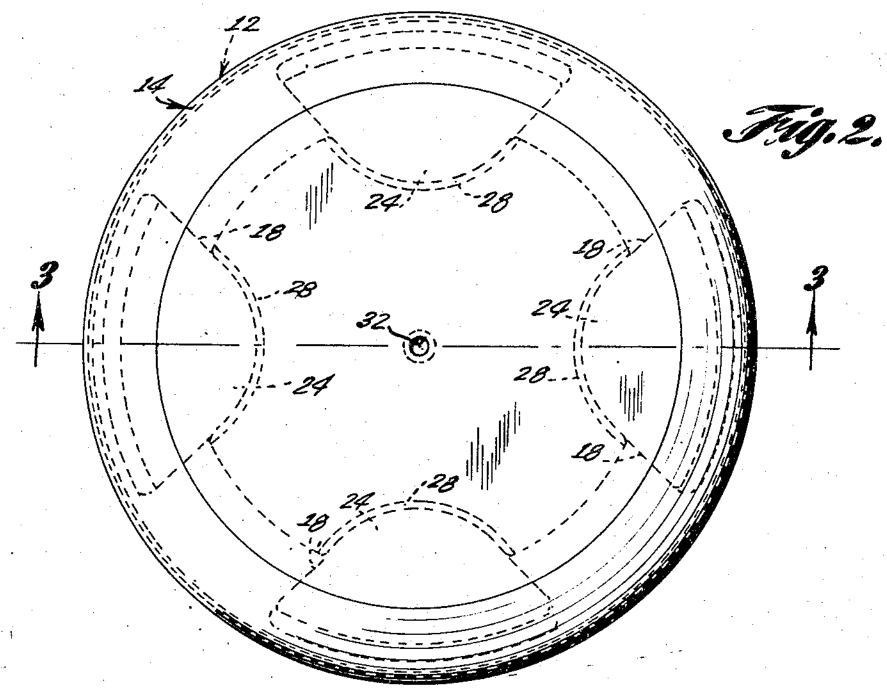
INVENTOR.
Charles W. Starr
BY
McMorrow, Berman & Davidson
ATTORNEYS June 14, 1955 C. W. STARR 2,710,485
POISON BAIT STATION
Filed March 30, 1954 2 Sheets-Sheet 2
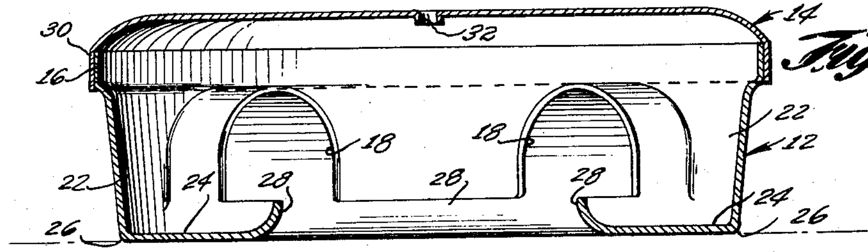
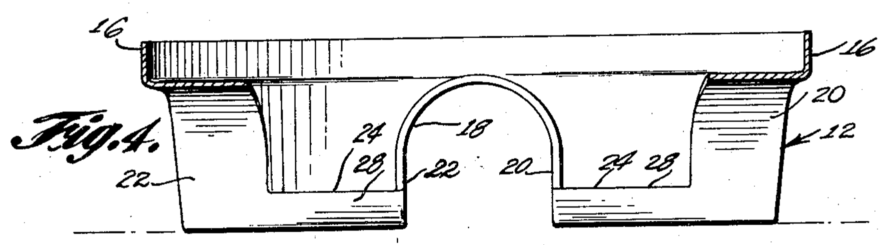
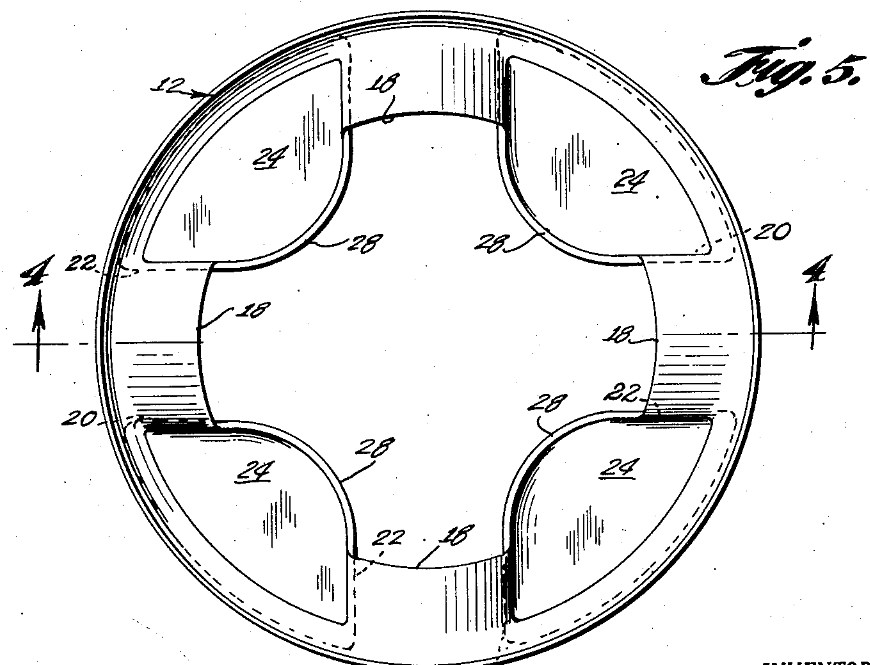
INVENTOR.
Charles W. Starr
BY
McMorrow, Berman + Davidson
ATTORNEYS United States Patent Office 2,710,485

Patented June 14, 1955

2,710,485

POISON BAIT STATION

Charles W. Starr, Caldwell, Idaho

Application March 30, 1954, Serial No. 419,842

1 Claim. (Cl. 43—131)

This invention relates to holders for poisoned material or food and particularly to a poison bait station such as to be used for poisoning of rodents.

It is an object of this invention to provide a poison bait station in which the poisoned preparation is protected against its being distributed or scattered in places where domestic animals might find and eat it.

It is a further object of this invention to provide a poisoned bait station or holder for the poison-bearing material housed so that it will be guarded from access to other than those small animals such as rats, mice, and other rodents which are undesirable and whose extermination is beneficial.

It is yet another object of this invention to provide a bait holder in which the poison-bearing bait material will be prevented from absorbing moisture from the damp ground when the holder or station is placed out of doors, and also to protect the poison-bearing bait material from rain or dew, thereby allowing the bait to stay in good condition and be effective over a much longer period of time, and in which condensation will be prevented from forming within the housing of the station or the holder.

It is a still further object of this invention to provide a poisoned bait station or holder comprising a minimum number of parts which are readily and easily assembled and are made of relatively inexpensive materials adapted to be fabricated by simple manufacturing steps hence, resulting in a low unit cost.

Other objects and advantages will become apparent from the following detailed description, forming the specification, and taken in conjunction with the accompanying drawings, wherein:

Figure 1 is a perspective view of a poison bait station embodying this invention;

Figure 2 is a top plan view thereof;

Figure 3 is a cross sectional view taken on line 3—3 of Figure 2;

Figure 4 is a cross sectional view taken on line 4—4 of Figure 5; and

Figure 5 is a bottom plan view, with the cover removed.

With continued reference to the drawings, there is shown a poison bait holder or station, generally indicated at 10, and which generally comprises an upstanding wall 12 and a lid or cover 14 removably carried by the upper and peripheral flange 16 of the wall which projects slightly outwardly of the wall to define a short overhang.

The wall 12 is provided with a plurality of equally spaced openings 18 therethrough to communicate with the area enclosed by the wall. The openings 18 are in the form of archways and have oppositely disposed archway walls 20 and 22 which extend from the outer perimeter of the wall toward the center of the area enclosed by the wall and generally perpendicular to the wall perimeter. The openings or archways 18 are formed as an integral part of the wall 12 and are of such dimension as to permit the entrance and exit of small rodents, such as rats and mice, but not large enough to permit access of larger animals, such as dogs, cats, chickens or other domestic animals to the interior area enclosed by the wall 12.

A plurality of spaced poison vats 24 are preferably formed integrally with the wall 12 and extend from the lower edge 26 thereof and extending generally or substantially perpendicularly thereto in a direction toward the center of the area enclosed by the wall 12. Each of the vats 24, adapted to have poisoned bait material placed therein, is disposed between the openings or archways 18 and is provided with an upstanding lip 28 formed peripherally thereabout and extending from the edge of one archway wall 20 remote from the wall 12 to the adjacent edge 22 of the next opening or archway 18 and to the edge of such archway remote from the wall 12. Thus, it will be seen that each of the vats extend between adjacent walls of succeeding archways.

As illustrated in the figures of the drawings, the wall 12 is shown as being circular, however it may assume any desired shape. The vats 24 are illustrated as being generally triangular, however the specific shape of the vats may take any desired form insofar as geometrical configuration is concerned.

The wall 12, openings or archways 18 and the walls 20 and 22 of the archways as well as the vats 24 may all be made integrally and of a suitable sheet material such as metal, treated fibre or suitable plastic. Since it is contemplated that the poison bait station or holder 10 will be employed out of doors, it is desirable that material from which it is made be rust and corrosion resistant.

The lid or cover 14 is complementarily shaped to conform to the peripheral shape of the wall 12 and is provided with a depending peripheral flange 30 which is adapted to closely overlie the upper flange 16 formed peripherally about the wall 12 so that the cover or lid 14 is readily removable therefrom and when in place on the wall 12, as shown in the figures of the drawings, will close the upper end of the wall 12 and cover the area enclosed by the wall so that the poisoned bait material placed in the vats 24 will be protected against natural moisture such as rain or dew. The lid or cover 14 is also provided with a central opening 32 therethrough so that when the cover is carried on the upper end of the wall 12, a hole or opening 32 in the lid or cover will prevent condensation from forming within the area enclosed by the wall 12 and hence prevent condensation on the poisoned bait material placed in the vats 24. The cover may be made of sheet metal or plastic material.

The poisoned bait material may be placed in the vats 24 when the cover or lid 14 is removed, and after the bait has been properly placed in the vats 24, the removable cover or lid 14 is replaced on the top of the wall 12.

From the foregoing, it will be apparent that there has been provided a poison bait station for rodents which comprises an upstanding wall 12 having a plurality of equally spaced poison vats 24 extending from the lower edge 26 thereof and perpendicularly thereto in a direction toward the center of the area enclosed by the wall 12, the wall 12 being provided with spaced apart openings to permit ingress and egress of rodents attracted to the poison vats 24, and a lid or cover 14 removably carried on the upper end flange 16 of the wall 12 to close the upper end of the wall and to cover the area enclosed by the wall. The vats 24 are equally spaced and disposed between the openings 18 with each of the vats having an upstanding lip formed peripherally thereabout from the edge of one opening or archway 18 to the adjacent edge of the next opening between which the vats 24 extend.

An important feature of this invention is the manner in which the rodents to be poisoned may feed from the vats 24 without leaving the ground.

While there are shown and described the preferred embodiment of the invention, it is to be understood that the structure is susceptible to change and modification within the practicability of the invention and therefore should be limited only by the scope of the claim appended hereto.

What is claimed is:

A poison bait station for rodents comprising an upstanding wall having a plurality of spaced poison vats extending from the lower edge thereof and perpendicularly thereto in a direction toward the center of the area enclosed by said wall, spaced apart openings provided in said wall to permit ingress and egress of rodents attracted to the poison vats, and a cover removably carried on the upper end of said wall to close said upper end and to cover the area enclosed by said wall, said vats being equally spaced and disposed between said openings, each of said vats having an upstanding lip formed peripherally thereabout from the edge of one opening to the adjacent edge of the next opening between which said vat extends.

References Cited in the file of this patent

UNITED STATES PATENTS

| | | |
|---|---|---|
| 1,321,360 | Bright | Nov. 11, 1919 |
| 2,532,681 | Stover | Dec. 5, 1950 |
| 2,664,663 | Mullen | Jan. 5, 1954 |

FOREIGN PATENTS

| | | |
|---|---|---|
| 193,851 | Switzerland | 1938 |